(12) United States Patent
Cochofel et al.

(10) Patent No.: US 6,418,363 B2
(45) Date of Patent: Jul. 9, 2002

(54) VEHICLE SUSPENSION CONTROL SYSTEM

(75) Inventors: Helder Cochofel, Big Rapids; David Shank, Hersey; John Washeleski, Cadillac, all of MI (US)

(73) Assignee: Nartron Corporation, Reed City, MI (US)

( * ) Notice: Subject to any disclaimer, the term of this patent is extended or adjusted under 35 U.S.C. 154(b) by 7 days.

(21) Appl. No.: 09/752,262

(22) Filed: Dec. 29, 2000

Related U.S. Application Data

(63) Continuation-in-part of application No. 08/878,380, filed on Jun. 18, 1997.

(51) Int. Cl.$^7$ ............................................. B60G 17/015
(52) U.S. Cl. .................... 701/37; 280/5.514; 280/5.513; 280/5.515
(58) Field of Search .................. 701/37, 91; 280/5.515, 280/5.514, 5.513, 5.508; 180/41

(56) References Cited

U.S. PATENT DOCUMENTS

| | | | |
|---|---|---|---|
| 2,911,632 A | 11/1959 | Levine et al. | 340/870.31 |
| 3,020,527 A | 2/1962 | MacLaren | 340/870.32 |
| 3,891,918 A | 6/1975 | Ellis | 324/207.16 |
| 4,064,396 A | 12/1977 | Panarello | 702/86 |
| 4,358,762 A | 11/1982 | Wolf et al. | 340/870.35 |
| 4,408,159 A | 10/1983 | Prox | 324/207.12 |
| 4,555,120 A | 11/1985 | Frait et al. | 280/6.158 |
| 4,742,794 A | 5/1988 | Hagstrom | 114/286 |
| 4,839,590 A | 6/1989 | Koski et al. | 324/207.21 |
| 4,873,655 A | 10/1989 | Kondrashe | 702/86 |
| 4,909,536 A | 3/1990 | Hale | 280/6.157 |
| 4,914,610 A | 4/1990 | Shimzu | 702/97 |
| 5,017,867 A | 5/1991 | Dumais et al. | 324/207.13 |
| 5,031,934 A | 7/1991 | Soltis | 280/6.157 |
| 5,045,785 A | 9/1991 | Hanesen | 324/207.16 |
| 5,060,959 A | 10/1991 | Davis et al. | 280/5.514 |
| 5,322,321 A | 6/1994 | Yopp | 280/6.158 |
| 5,855,379 A * | 1/1999 | Buma et al. | 280/5.514 |

FOREIGN PATENT DOCUMENTS

SU 1232-931 A 12/1989

OTHER PUBLICATIONS

Automotive Electronics Handbook, 1994, pp. 17.6, 17.7, 17.8.
Automotive Handbook (3$^{rd}$ Edition) pp. 560–563.
1994 Cadillac Northstar Series.
Automotive News (Sep. 7, 1992).
Automotive Newsfront, Feb. 1992.
Automotive Industries, Feb. 1992.

* cited by examiner

*Primary Examiner*—William A. Cuchlinski, Jr.
*Assistant Examiner*—Marthe Marc-Coleman
(74) *Attorney, Agent, or Firm*—Watts, Hoffman, Fisher & Heinke, Co., L.P.A.

(57) ABSTRACT

A motor vehicle having at least one fluid-pressurized height adjusting member having first and second separable components. Apparatus includes an integrated vehicle ride height system control system. The control system includes an electronic output drive signal circuit and input signal interpretation circuit to electronically interface with at least one position sensor. The position sensor provides output signals related to extent of separation of said first and second separable components of the fluid pressurized height adjusting member.

57 Claims, 9 Drawing Sheets

VEHICLE SUSPENSION CONTROL SYSTEM

CROSS REFERENCE TO RELATED APPLICATIONS

The present application is a continuation in part of U.S. patent application Ser. No. 08/878,380, filed Jun. 18, 1997 entitled Linear Position Sensor System. The subject matter of this application is incorporated herein by reference.

FIELD OF THE INVENTION

The present invention concerns an active suspension system for vehicle level control under either manual and/or automatic control.

BACKGROUND ART

Vehicle suspension systems perform various functions that affect the ride of the motor vehicle. A vehicle suspension system includes various different elements such as springs, shock absorbers, mechanical linkages, and structural members to "suspend" the mass of the motor vehicle.

Springs provide an upward force against the vehicle frame and the force is related to an amount of deformation of the spring. Spring types include coil springs, leaf springs, bar springs, torsion springs and gas springs.

Shock absorbers provide a force related to the rate of change of an extension of the shock absorber component. A typical shock absorber utilizes hydraulic oil to damp motion via fluid flow impedance through at least one flow-restricting orifice. Improved shock absorbers incorporate at least one pressure-actuated valve providing variable damping via multiple orifice and/or variable orifice size to provide variable net damping based upon position and/or dynamic conditions. Gas-assist shock absorbers further incorporate internal gas springs and valves to significantly reduce damping of rebound relative to jounce to reduce rebound time and maintain more average height.

More advanced shock absorbers use electro rheological and magneto rheological fluids with active control of fluid viscosity through an orifice to vary motion damping. Major drawbacks to utilization of electro rheological (ER) fluids include moisture susceptibility, contamination susceptibility, and very high voltage requirements. Response time for magneto rheological (MR) fluids from Lord Corporation is reportedly less than 25 ms to 50 ms. Advantages of MR fluids relative to ER fluids include lower material cost, much lower susceptibility to moisture contamination, and low drive voltage requirements.

Vehicle performance and handling improvements enabled by dynamic stability controls and electronic suspensions are becoming more practical when powered by higher voltages as for example new proposed 42 volt DC supplies. Peak and average power loads reported for a typical active suspension system are 12 KWatt and 360 Watt, respectively. Technological advancements in sensing, computing, suspension mechanisms, fluid power, electrical power, and controls result in various active system control implementations responding to multiple static and dynamic vehicle and suspension unit inputs.

One prior art active suspension (Davis U.S. Pat. No. 5,060,959) for a vehicle includes an electrically powered device acting either alone or in parallel with a static load carrying device such as a fluid spring or coil spring. Another prior art active suspension system (Yopp U.S. Pat. No. 5,322,321) incorporates multiple dual suspension units, each including an electrically powered actuator for slower force adjustments combined with a gas assist spring for faster force adjustments utilized either alone or with other type active suspension systems such as electromagnetic, hydraulic, or hydro pneumatic for actively adapting vehicle ride height. Dynamic suspension systems employ the function of changing spring rate and damping force in accordance with driving conditions and road surfaces.

To overcome limitations of fixed rate damping and spring element systems, unpowered or low-powered systems vary damping rate and/or height in response to relatively slow changes in vehicle load. Because of the inflexibility of fixed rate damping and spring element systems, adaptive control systems have been proposed wherein the spring rates, ride heights, and/or damping rates are varied as a result of criteria such as road inputs, vehicle turning, and vehicle loading.

Static height control systems respond to sensed height to actuate height control when the vehicle is not in motion. Relatively slow actuator response time for such systems takes seconds or tens of seconds. An improvement to basic mechanical spring and shock systems includes slow speed leveling and/or height adjustment actuation of a static vehicle via pneumatic springs either manually or automatically controlled. This adjustment requires that the vehicle be moved to a level location while adjusting gas pressure to gas springs (that supplement metal springs) to move the vehicle to a desired height and/or level attitude. Quantities of gas spring components range from one per vehicle for simple rear end up/down actuation to multiple springs per suspension unit for complete height and level attitude actuation.

Dynamic leveling systems respond to numerous inputs to actuate height control and/or damping control when the vehicle is moving. Faster actuation response times for active suspension systems range from under one hundred milliseconds to several hundreds of milliseconds. Recently adopted mechanical shock absorber valve systems respond and adapt to jounce acceleration in approximately 10 milliseconds. A goal of such systems is a damping response time of less than 7 milliseconds, preferably less than 5 ms. Based upon vehicle speed, one type of vehicle height control system automatically lowers the vehicle height at higher vehicle speeds to lower ground effect wind resistance with resultant improved handling and reduced fuel consumption. A separate feature is a process that increases vehicle body height on rough road surfaces.

Existing active suspension system sensing inputs include a mode select switch, stop lamp switch, door switch, alternator, check terminal, diagnosis clear terminal, vertical height, first derivative of height with respect to time (velocity), second derivative of height with respect to time (acceleration), load force using a load cell, gas pressure, hydraulic pressure, ball screw motor torque via torque sensor or current measurement, motor position encoder, motor position resolver, vehicle speed, throttle position, wheel slippage, wheel sensors, body deflection, angular acceleration, lateral acceleration, chassis pitch, chassis roll, brake sensor, and anti-lock braking system inputs.

One representative prior art patent relating to a vehicle active suspension system is U.S. Pat. No. 5,322,321 to Yopp. This patent concerns an active suspension system that includes an electrically powered actuator utilized with a height sensor and a gas spring controlled by a gas supply that pressurizes and vents the gas spring to quickly add or remove a predetermined force as needed in assisting the electrically powered actuator.

SUMMARY OF THE INVENTION

The present invention is intended for use with a motor vehicle having at least one fluid-pressurized height adjusting member having first and second separable components. Apparatus constructed in accordance with the invention includes an integrated vehicle ride height system control system. The control system includes an electronic output drive signal circuit and input signal interpretation circuit to electronically interface with at least one position sensor. The position sensor provides output signals related to extent of separation of said first and second separable components of the fluid pressurized height adjusting member.

An exemplary control system also includes electronic input and/or output circuitry to interface with at least one fluid pressure sensor which provides output signals related to a fluid-pressurized height-adjusting member.

The exemplary control system also includes an electronic output circuitry to drive output power control for at least one fluid flow valve which applies pressure to the at least one fluid-pressurized height adjusting member to actuate the height adjusting member to raise the vehicle. The exemplary control system also provides an electronic output coupled to at least one fluid flow valve which releases pressure from the fluid-pressurized height adjusting member to lower the vehicle. The control system also includes electronic output circuitry to control a fluid pressure pump to provide system fluid power.

The Exemplary control system include a programmable controller that implements control algorithms for vehicle height control output functions in response to vehicle input signals.

These and other objects, advantages and features of the invention will become better understood from the following detailed description of a preferred embodiment of the invention which is described in conjunction with the accompanying drawings.

BRIEF DESCRIPTION OF THE DRAWINGS

FIGS. 4, 4A and 5–8 are flow diagrams for use in implementing control functions of the invention.

BEST MODE FOR PRACTICING THE INVENTION

Figure 1:
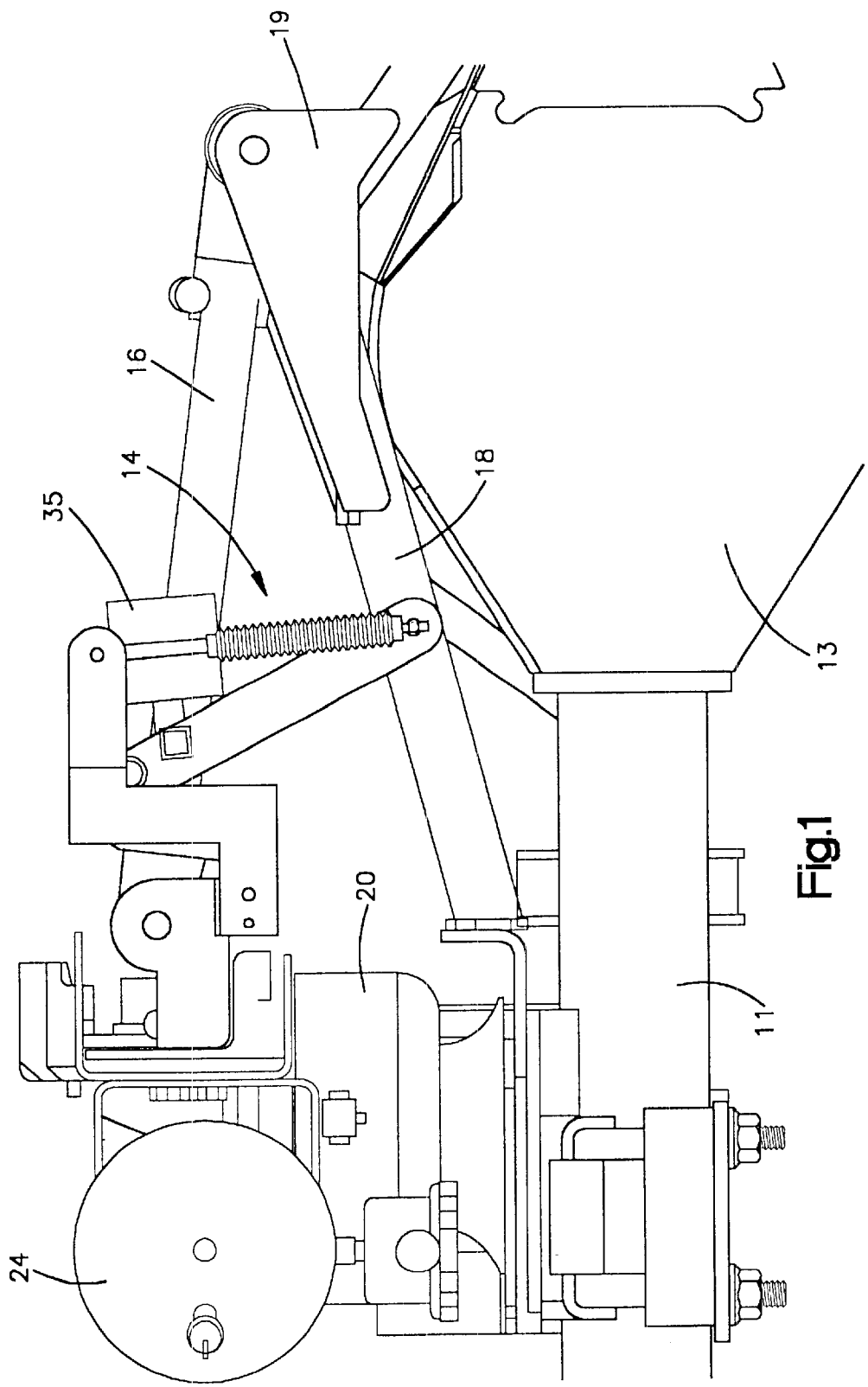
FIG. 1 is a schematic depiction of a pressured gas spring or shock absorber with an external height adjustment sensor for use in accordance with an exemplary embodiment of the invention.

The drawings illustrate an integrated vehicle ride height system control system 10. FIG. 1 is a view from a rear of a vehicle in the vicinity of an axle housing 11 and a differential 13. FIG. 1 also shows a position sensor 14 mounted external to an air spring 20. The position sensor 14 might alternately be directly incorporated within the air spring 20. As depicted in FIG. 1, the position sensor 14 is not connected directly to the air spring 20.

Figure 2:
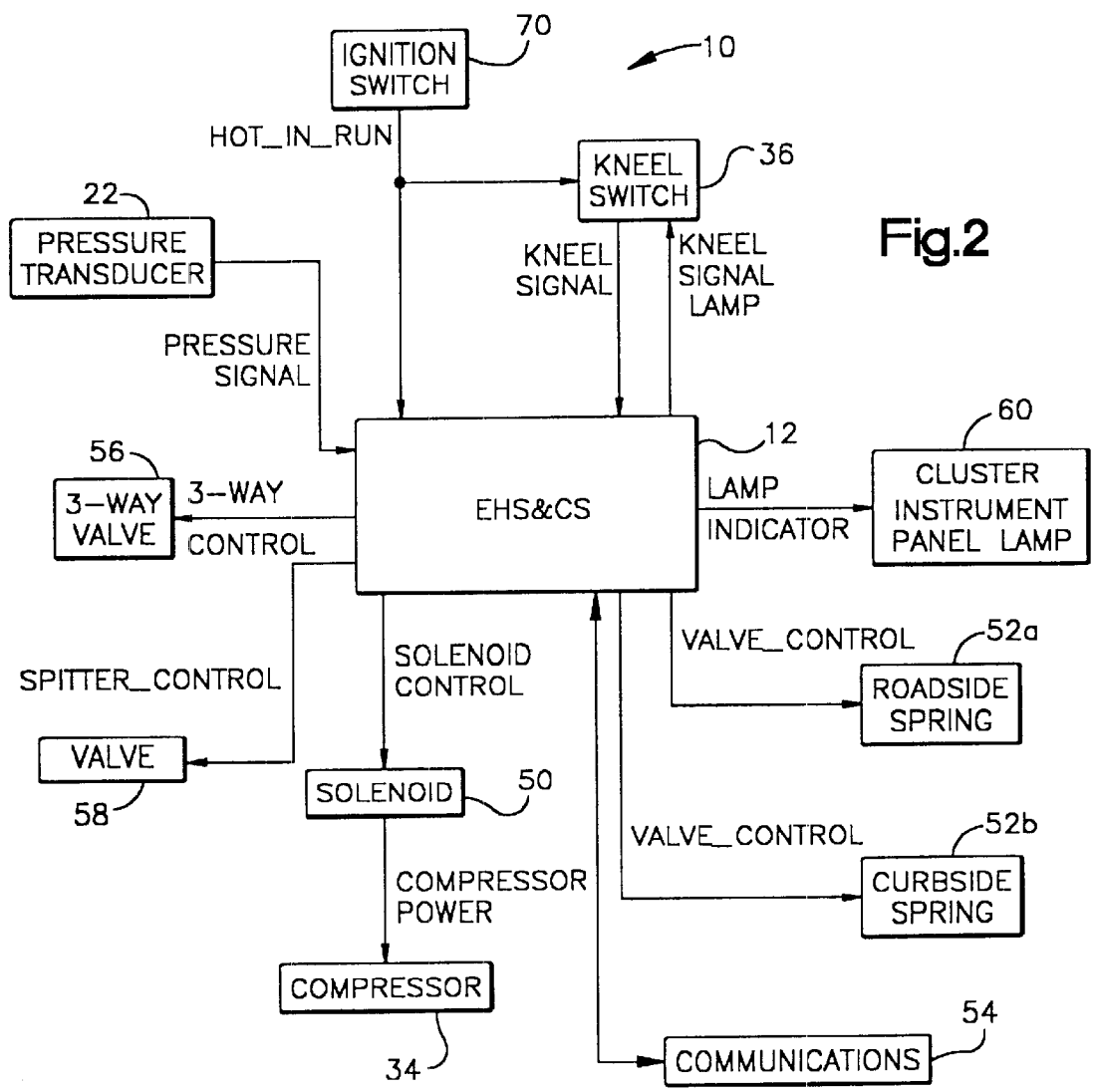
FIGS. 2 and 3 are schematic depictions of control functions implemented by use of the present invention.
Figure 9:
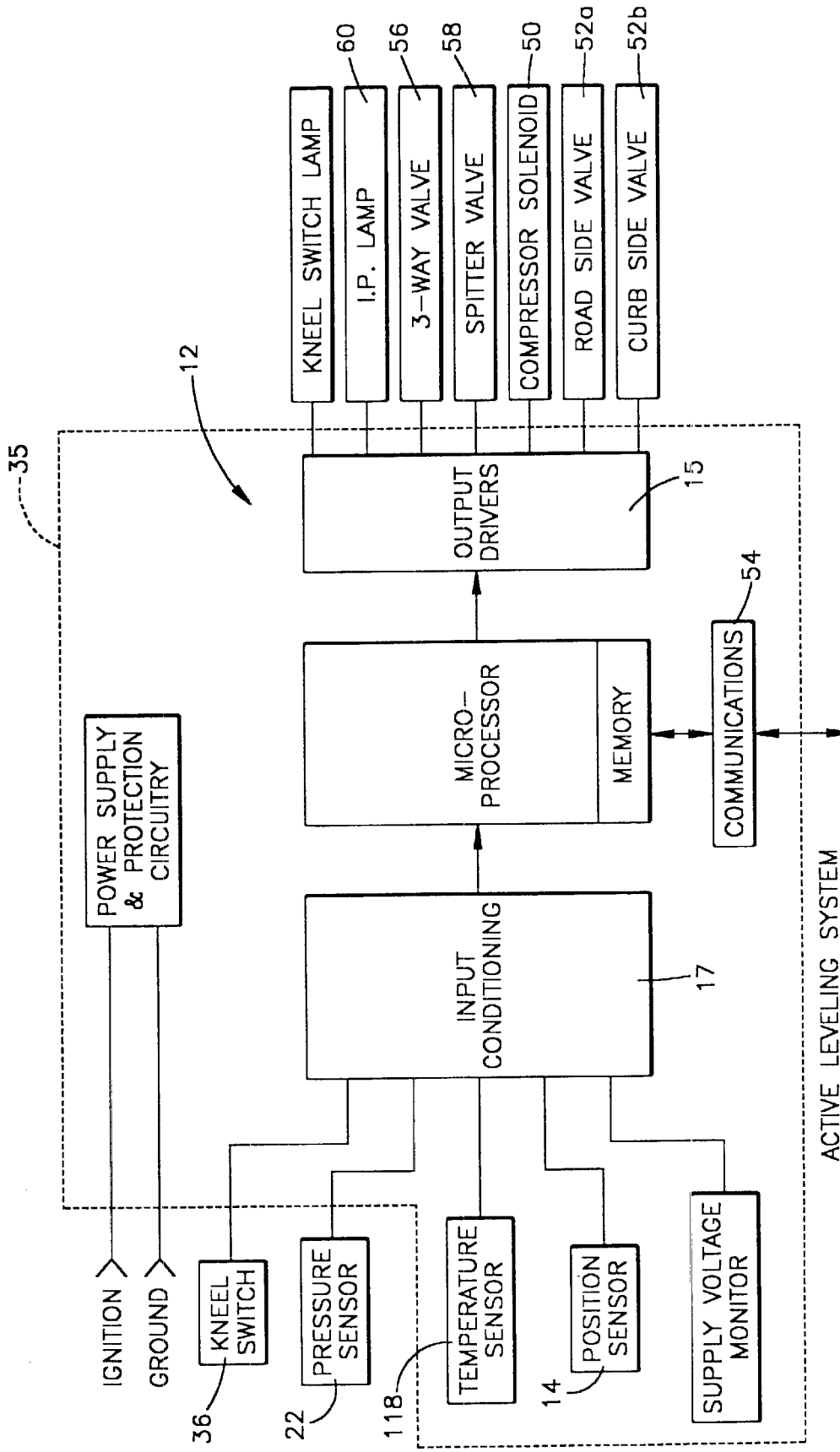
FIG. 9 is a block diagram schematic of a representative system for use with the present invention.

As seen in the functional schematic of FIGS. 2 and 9 the control system 10 includes an electronic output drive signal circuit 15 that forms part of a programmable controller 12 for providing control outputs. The programmable controller 12 also includes an input signal interpretation circuit or interface 17 to monitor input signals from, as one example, the position sensor 14. The position sensor 14 provides output signals to the controller 12 related to the extent of separation of the first and second separable components 16, 18 (FIG. 1) that are pivotally connected to each other at one end of the components 16, 18 attached to a vehicle frame 19. The angular separation between these components 16, 18 and hence the ride height of the vehicle can be controlled by adjusting a pressure within the air bag spring 20. Responses to this movement are monitored by the position sensor 14.

The controller 12 also includes electronic input and/or output circuitry to interface with at least one air pressure sensor 22 (FIGS. 2 and 9) which provides output signals related to a sensed state of an air-pressurized air reservoir 24.

The exemplary control system also includes an electronic output circuitry to drive output power control for at least one air flow valve which selectively applies pressure to the air bag spring 20 to raise the vehicle. The exemplary control system also provides an electronic output coupled to at least one air flow valve which releases pressure from the air bag spring 20 to lower the vehicle. The control system also includes electronic output circuitry to control an air pressure pump or compressor 34 to provide system air power.

The programmable controller 12 constructed in accordance with the exemplary embodiment of the invention also implements control algorithms for vehicle height control output functions in response to vehicle input signals. These control algorithms are depicted in the flow diagrams of FIGS. 4, 4A and 5–8. The controller 12 measures and modifies the height of the vehicle body with respect to the rear axle housing 11. As loading on the vehicle changes due to the presence of passengers, luggage, trailers, and such, the rear of the vehicle is raised or lowered in order to maintain a level vehicle body. The controller 12 also provides a 'kneeling' function which allows the vehicle operator to manually lower the rear of a vehicle for easy disconnection of a trailer, etc.

The position sensor 14 is most preferably constructed using an elongated wound coil including a signal control member that overlaps a portion of the coil. A representative sensor would include for example structure constructed in accordance with the teaching of U.S. Pat. No. 5,642,043 to Ko et al. The contents of this '043 patent to Ko et al is incorporated herein by reference.

CONTROLLER OVERVIEW

Figure 3:
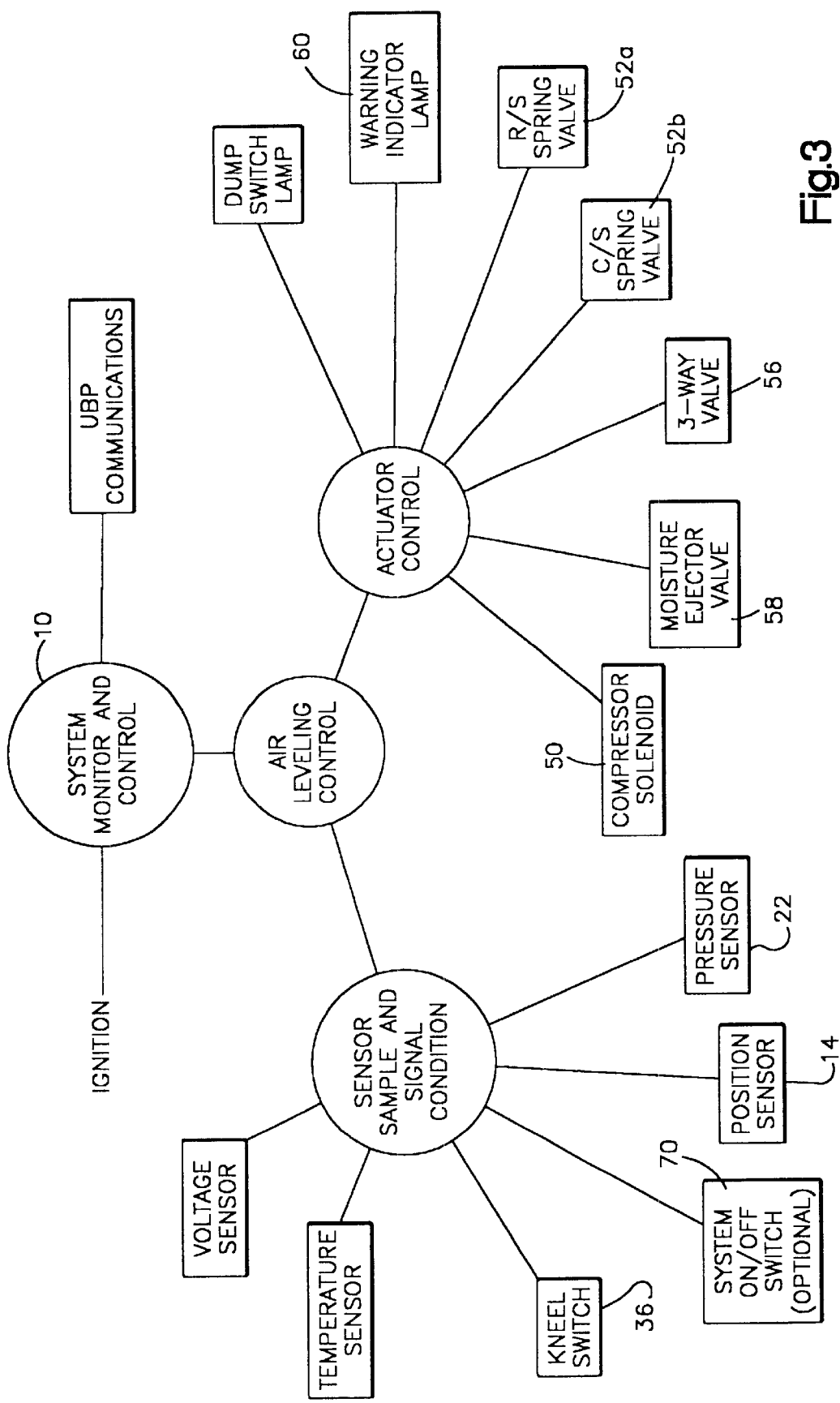

The disclosed embodiment of the invention is a packaged in a self contained module or housing 35 attached to elements of a lateral control mechanism at the rear of the vehicle, near or at the vehicle differential 13. The controller 12 monitors inputs from a vehicle ignition, vehicle ground and the position sensor 14 and provides output signals for controlling a compressor drive, a three way valve and inflate valves. The controller includes an EEPROM that allows certain constants used during operation to be stored in memory of the programmable controller. One such constant is a customer height selection that can be adjusted and is set at the factory and stored in the EEPROM. FIGS. 2 and 3 provide a functional block diagram of the functions performed by an exemplary embodiment of the invention.

CONTROLLER INPUTS

The vehicle ignition is used to power up the controller 12 and in accordance with the exemplary embodiment is a 12 volt positive switch signal. Ground to the controller 12 is provided from the negative vehicle battery terminal. The pressure sensor 22 provides an signal input to the controller 12. The pressure sensor has a working range of 0–150 pounds per square inch and will provide the controller 12 with an analog voltage signal from 0–5 volts that is proportional to pressure. The height position sensor 14 has an active range of 77 millimeters. The height position sensor 14 also provides an analog voltage signal in the range from 1–4 volts. A kneel switch 36 provides an input to the controller 12 that informs the controller that the user wants the vehicle to switch between a trim mode and a kneel mode. A kneel position is defined as the vehicle position when air bladders of the spring 20 are vented to atmosphere to lower the vehicle body including the frame to a minimum position. The kneel switch also is used to enter a kill or off mode described below.

Figure 4:
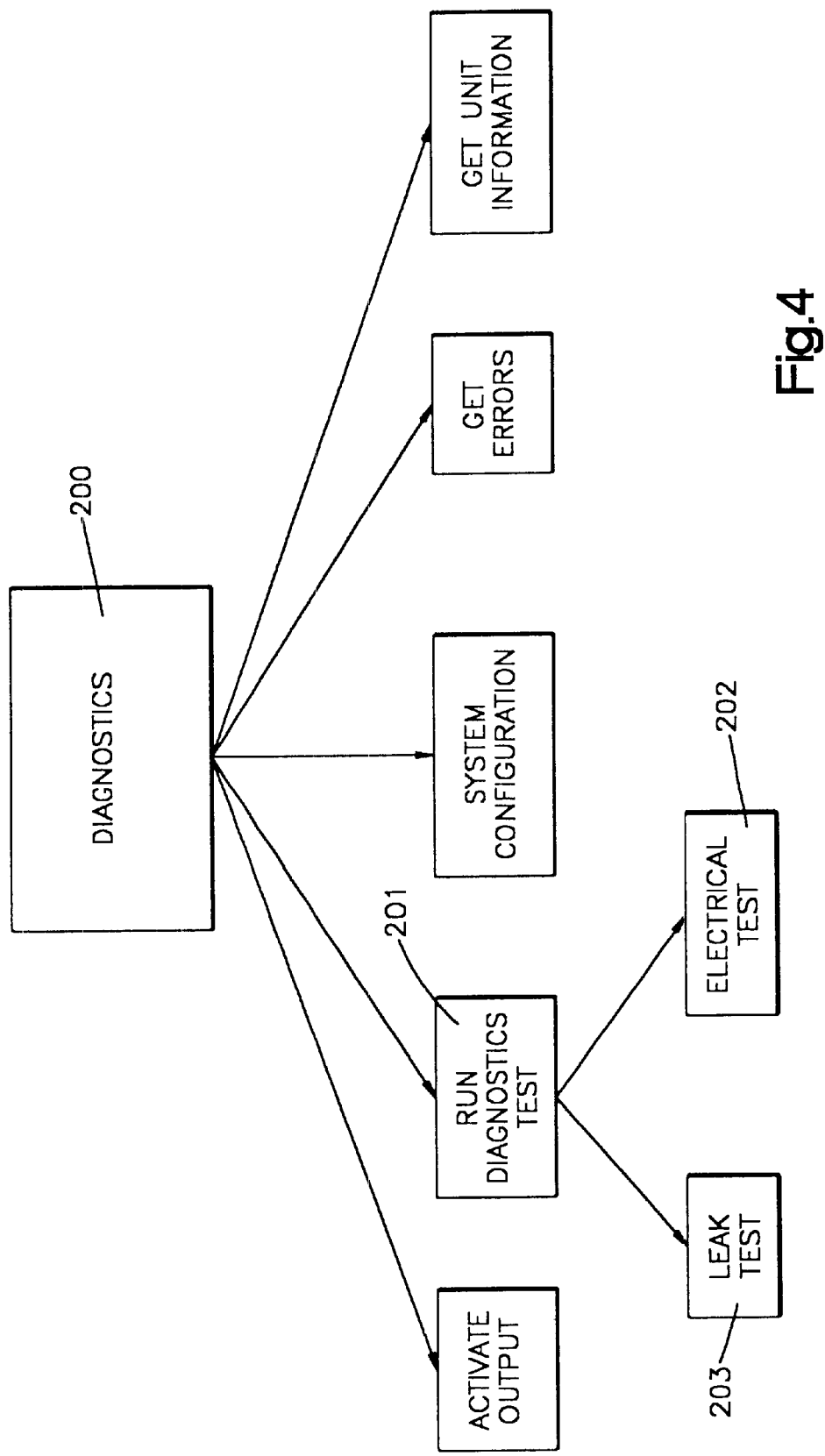
Figure 5:
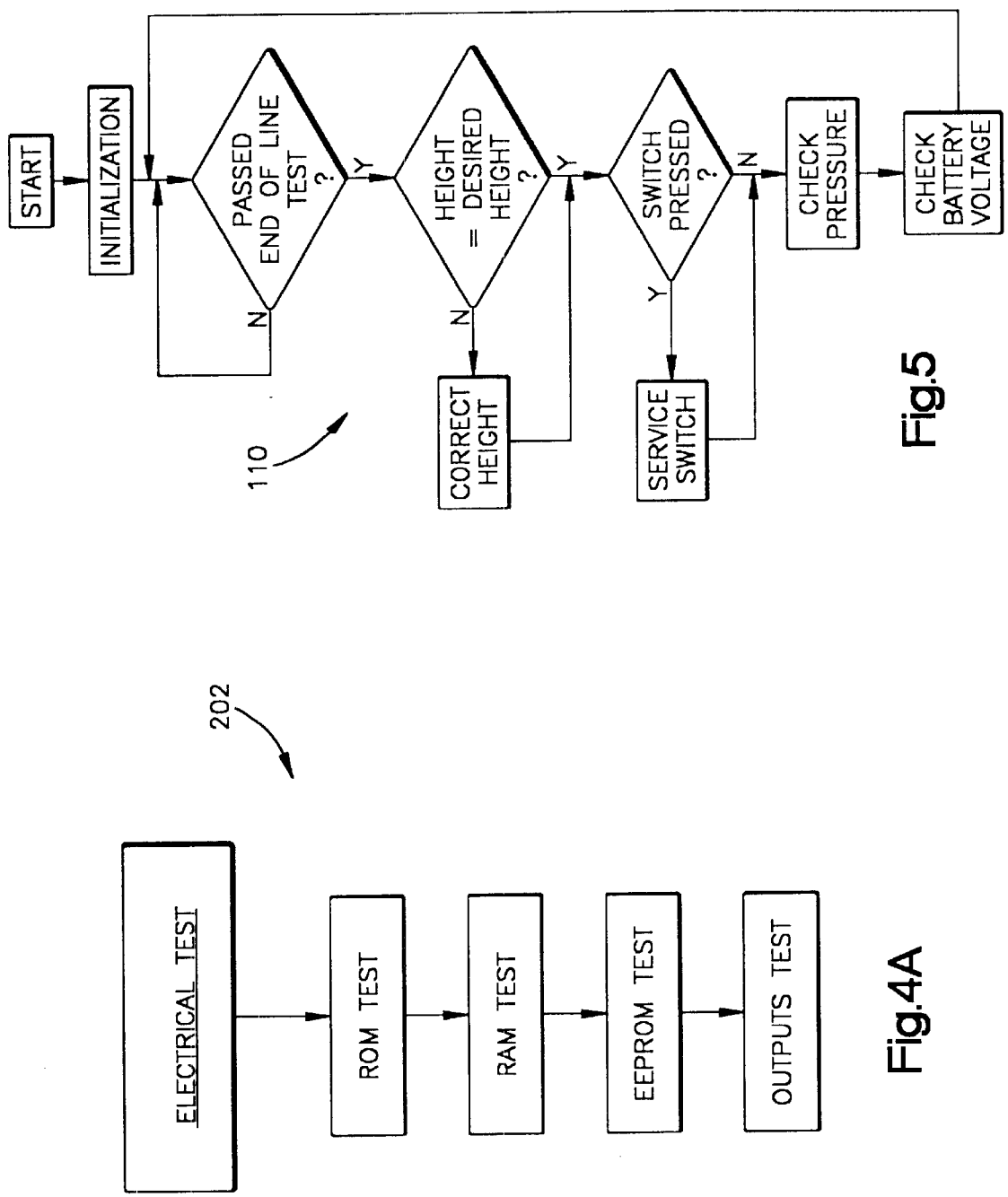
Figure 6:
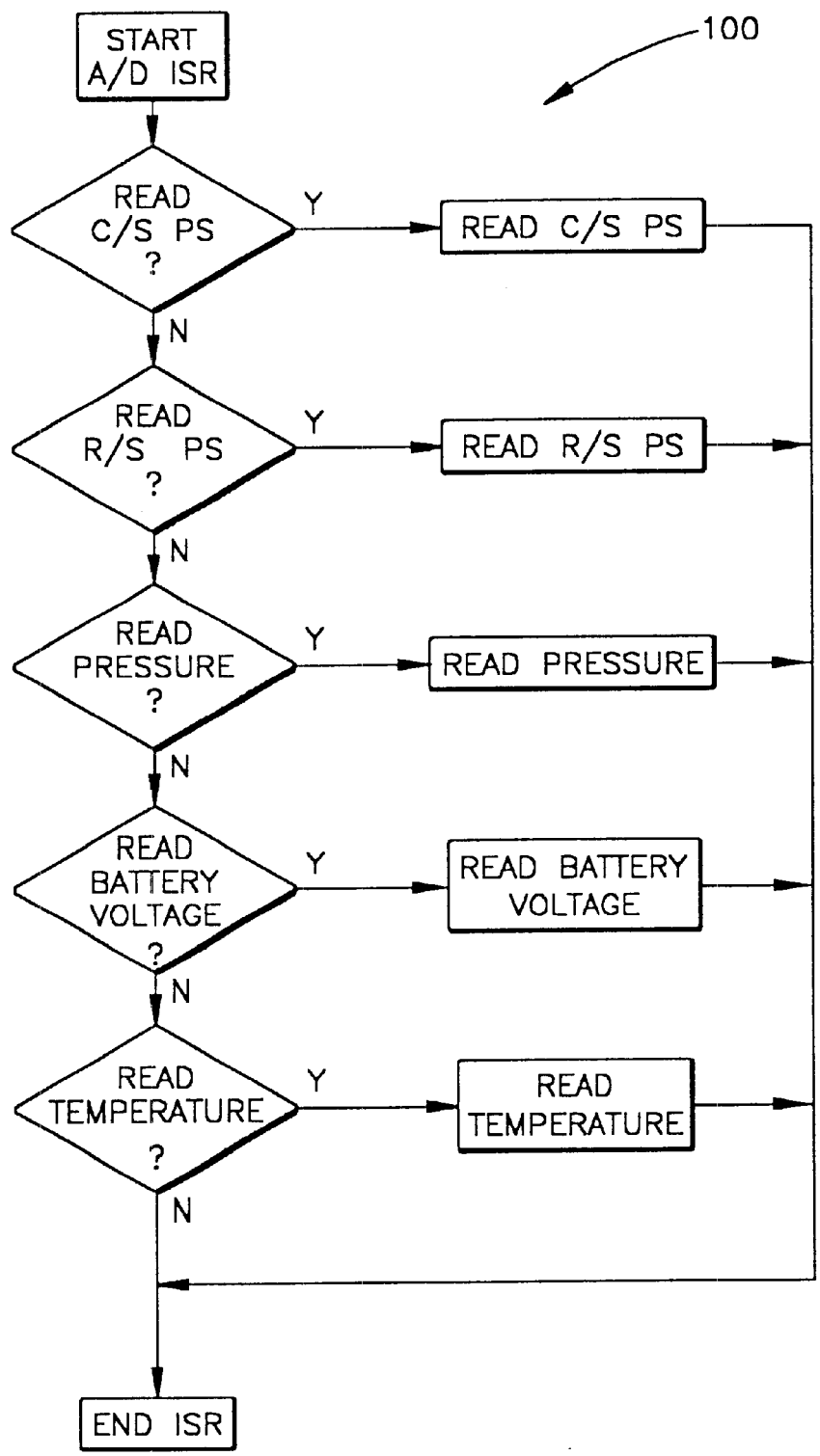
Figure 7:
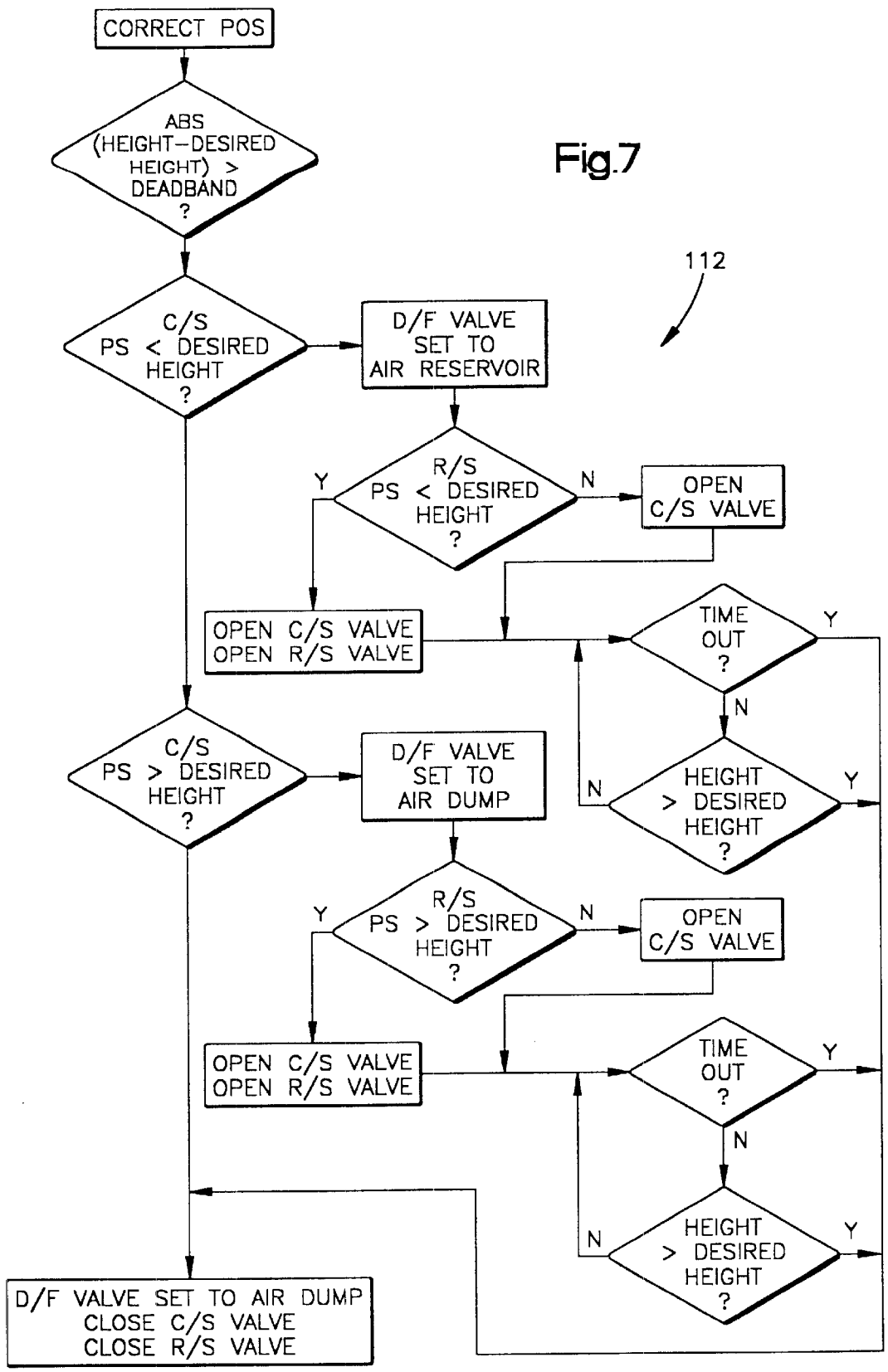
Figure 8:
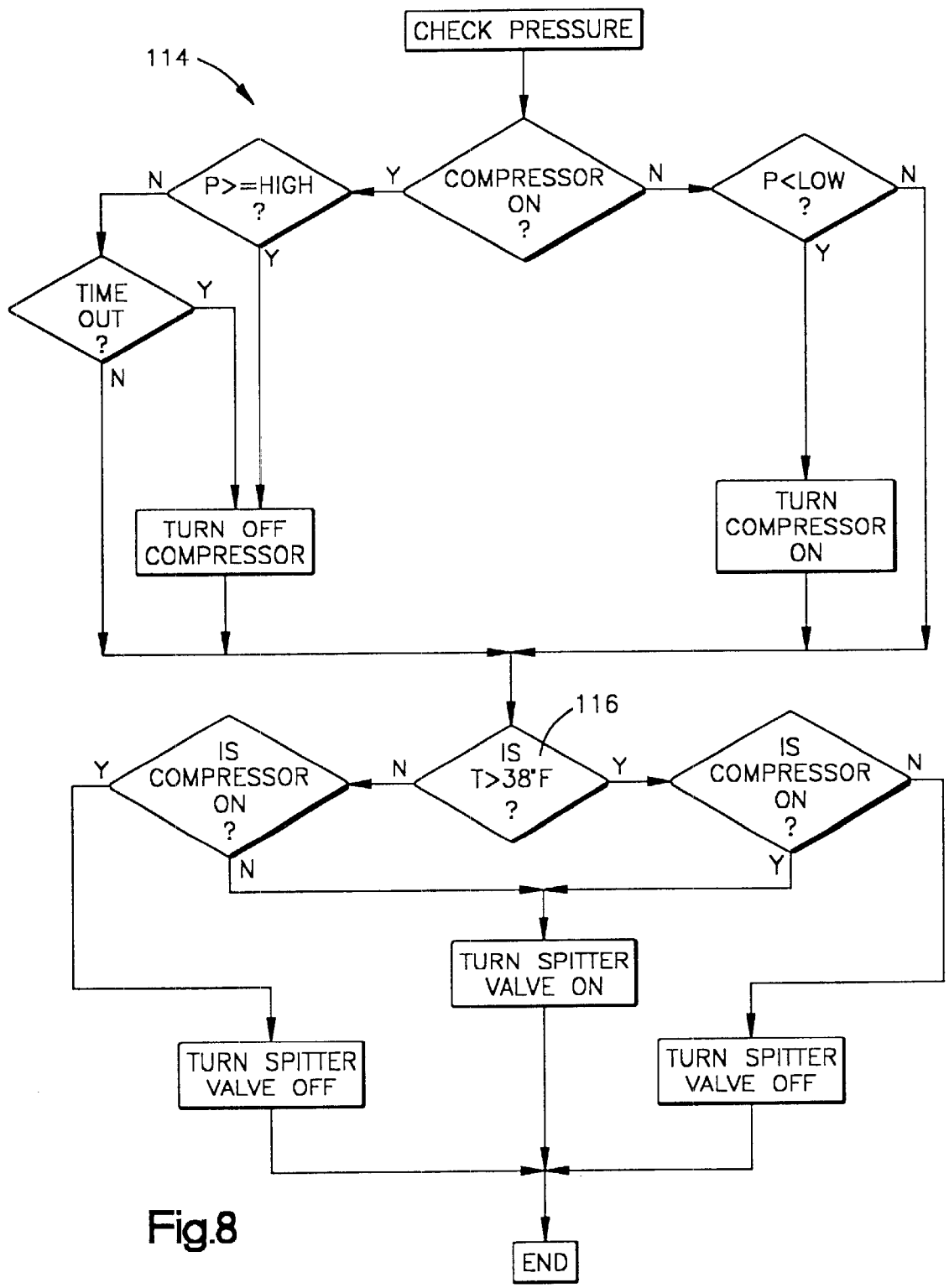

The controller 12 incorporates an asynchronous serial communications interface through which it receives setup and diagnostic commands as well as vehicle speed information. During the manufacturing process, the vehicle suspension is blocked to a reference height and a programming tool is connected to the controller via the wiring harness connector. The programming tool issues commands over the communications interface to record the reference height, from which the trim height is derived later in the manufacturing process. Diagnostic functions 200 of FIG. 4 are initiated by a command from a communications interface 54. This feature allows an external controller to query the controller 12 about past performance and gather information as well as control operation of the controller. One command that is activated by the external controller is a command to run a diagnostics test 201 which includes an electrical test 202 and a leak test 203. The electrical test 202 performs a series of memory tests on the controller and also activates certain outputs from the controller in a controlled manner.

CONTROLLER OUTPUTS

The controller 12 provides a battery output B+ through a solid state switch for energizing a compressor relay by means of a compressor solenoid 50. The controller provides a battery output B+ through additional outputs to energize curb side and road side inflate valves 52a, 52b. The controller 12 also supplies a B+ switched output through a solid state switch to energize a three way valve 56 which connects the air reservoir 24 to the inflate valves when energized. When de-energized, the three way valve 56 opens and will allow the air in the air bag springs to be vented to atmosphere if the inflate valves 52a, 52b are energized. The controller 12 also supplies a switched B+ signal through a solid state switch to energize a moisture ejector valve 58 that allows the purging of moisture from the air reservoir 24. The controller 12 also supplies a ground signal through a solid state switch to energize a lamp 60 to indicate when the system is in kneel mode, kill mode, or that a fault condition has been sensed.

OPERATION

The flow charts of FIGS. 4, 4A and 5–8 depict operation of the controller 12 both during normal operation 100 and during a diagnostic mode 200 of operation initiated by means of a control signal via the communications interface 54.

Rear leveling is accomplished by sensing the position of the vehicle body with respect to the rear axle 11. The sensed position of the vehicle body is then used to determine if the vehicle is in trim, is too low, or is too high. If the vehicle is too low, the controller 12 will activate the two height adjust valves 52a, 52b and the 3-way valve 56, to inflate the air system and hence increase the vehicle height. If the vehicle is too high, the control will enable the valves 52a, 52b to deflate the air system and hence decrease the vehicle height.

Once the vehicle leveling is achieved (trim position), the system 10 continues to monitor the vehicle position and make height adjustments as needed. A routine 100 (FIG. 6) periodically monitors the parameters used by the controller 12 in performing its functions. This routine is performed periodically regardless of the mode the controller is in.

In one embodiment of the invention there is a operator switch, the kneel switch 36, which has priority over any function or mode that the controller is performing. Alternate embodiments contemplate other user actuated inputs wherein the controller 12 includes circuitry and/or software for interfacing with manual control inputs for particular operational functions such as increasing and/or decreasing fluid spring stiffness characteristics of the vehicle suspension. These inputs could also respond to manual control inputs for particular operational functions such as increasing and/or decreasing fluid damping characteristics of the vehicle suspension.

The controller has eight modes of operation, initialization mode, trim mode, inflate mode, exhaust mode, kneel mode, kill mode, compressor mode, and diagnostics mode. These different modes are described in turn.

1. Initialization mode 110 (FIG. 5)—Upon receipt of a vehicle ignition signal when the ignition switch 70 is closed, the system 10 will initialize and allow normal operation after a 3 second delay. The delay will prevent quick cycling of the air compressor 34, valves 52a, 52b, etc, if the ignition is cycled at a rapid rate. During this time the system 10 will perform a RAM test and a checksum test of the ROM to validate the controller 12. If these tests fail, the system 10 does not operate. The first time the system 10 is powered up, the control will default to kill mode (described below). Otherwise, the system will enter the mode it was in when the ignition was last switched off.

2. Trim mode 112 (FIG. 7)—The system 10 provides a finite zone between vehicle high and vehicle low conditions wherein the vehicle is considered level. During such a condition, the controller 12 is in trim mode and no output drives are active, with the exception of the compressor output to the compressor solenoid 50. If pressure in the air reservoir falls below a preset level as sensed by the pressure transducer 22, the compressor 34 will turn on until it achieves adequate pressure in the reservoir. In the event that the system 10 is turned off via the kneel switch 36 during a return to trim from kneel operation, the trim function will continue until the trim position is achieved. Once trim is achieved, the system will go to kill mode under this condition.

3. Inflate mode—If the control detects a vehicle low condition for 10 seconds, the controller 12 enters inflate mode. In this mode, the controller 12 provides the appropriate outputs to activate the two inflate valves 52a, 52b, and the three way valve 56. This will allow air to flow into the suspension system and raise the vehicle. The controller 12 remains in inflate mode until trim mode is achieved as sensed by the linear position sensor 14. The controller 12 will terminate inflate mode if the compression duration times out, the ignition 70 is turned off, or the kneel switch 36 is activated. If the ignition 70 is turned on, and the controller 12 determines that the compressor 34 and/or inflate valves 52a, 52b and 56 should be on, the controller 12 will wait 2.5 seconds before enabling the required outputs.

4. Exhaust mode—If the controller 12 detects a vehicle high condition for 10 seconds, the controller 12 enters exhaust mode. In this mode the controller 12 provides the appropriate outputs to energize the inflate valves 52*a*, 52*b* which allows the 3-way valve 56 to vent air to the atmosphere from the air suspension system and lowers the vehicle. The control remains in exhaust mode until the trim position is achieved as sensed by inputs from the linear position sensor 14. The controller also exits the exhaust mode if an exhaust duration times out, the ignition 70 is turned off, or the kneel switch 36 is activated.

5. Kneel mode—If the controller 12 detects that the kneel switch 36 has been activated, the controller 12 enters kneel mode. In this mode the controller 12 provides the appropriate outputs to energize the inflate valves 52*a*, 52*b*. This releases air from the air suspension system through normally-open valve 56 and lowers the vehicle. The 3-way valve remains open throughout the duration of kneel mode. The IP indicator lamp 60 and the switch indicator located in the switch 36 will remain on during kneel mode. When in kneel mode, the controller 12 will activate the compressor 34 until the air reservoir has achieved maximum air pressure. The controller 12 remains in kneel mode until the kneel switch is activated. If the ignition is turned off, the vehicle will remain in kneel mode.

6. Kill mode—The system 10 can be turned on and off by double tapping the kneel switch (much like a computer mouse). Each key press must be greater than or equal to 100 ms, but less than 500 ms, with both key presses occurring within one second. If the double key press conditions are not met within the one second time frame, the sequence will be cleared and no mode change will occur. When in kill mode, the IP lamp 60 will slowly blink (one second on, 1 second off).

7. Compressor mode 114 (FIG. 8)—When the pressure in the air reservoir reaches a 90 psi low-pressure limit, the controller 12 will turn on the compressor 34. The compressor will remain on until a 125 psi maximum pressure is reached as sensed by the pressure transducer 22, the system 10 goes to kill mode or the ignition switch 70 is turned off. If the pressure does not reach the maximum pressure a preset selected time in seconds, the system will turn off the compressor and display a system fault on the IP indicator lamp 60. If the system is in the kneel mode and the pressure in the reservoir is below the maximum pressure minus 5 psi, the system 10 will turn the compressor 34 on.

8. Diagnostics mode 200 (FIGS. 4, 4A)—Diagnostics mode is entered when a "Request Diagnostics State" entry command is received over the communications interface 54. The controller remains in diagnostics mode until either a "Request Operation State" entry command is received, or no command of any sort is received for 5 seconds.

In diagnostics mode, commands may be issued to the controller through the communications interface to perform the diagnostics self-tests described in FIGS. 4A and 4B and to request the results of those test. Each of the outputs can be individually exercised and the inputs queried. Commands can be issued to raise or lower the vehicle and to record the reference height. Commands can also be issued to determine the operating state and version numbers of the controller.

Optional serial communications by such means as UBP (UART-Based Protocol) is used for diagnostics and/or function control. This enables the vehicle suspension control system to interface with other vehicle systems and/or aids in diagnostic performance evaluation.

As an option the IP indicator lamp could display a blinking pattern according to the type of error that is sensed. The diagnostic mode includes the following tests:

1. If the warning light does not come on the system fails.

2. The compressor is turned on for five seconds. If the pressure does not increase, the system 10 fails and the warning lamp will display 1 blink per cycle.

3. With the compressor off, if the sensed pressure changes, the test fails and the warning lamp is activated with two blinks per cycle.

4. An inflate operation is performed. The controller 12 will inflate the air suspension bladders for five seconds. If movement in the height sensor is not detected the test fails and the warning lamp will display 3 blinks per cycle.

5. With the valves off, if the height sensor changes the test fails and the warning lamp will display four blinks per cycle.

6. An exhaust operation is performed. The control will exhaust the air suspension bladders for 1 second. If the height sensor does not detect movement, the test fails and the warning lamp will display 5 blinks per cycle.

7. With the valves off, if the height sensor changes the test fails and the warning lamp will display 6 blinks per cycle.

8. If there is an electrical fault with the spitter valve drive or the compressor drive, the warning lamp will display 7 blinks per cycle.

9. If there is an electrical fault with the three way valve drive or the inflate valve drive, the warning lamp will display 8 blinks per cycle.

The controller remains in diagnostics mode until either a "Request Operation State" entry command is received or no command of any sort is received for 5 seconds.

A moisture ejector valve 58 is present on the system to drain any accumulated moisture from the air reservoir. As depicted in the flow chart of FIG. 8, a test 116 is performed the temperature as detected by means of a temperature sensor 118 is compared to a set point. When the temperature is above 38 degrees Fahrenheit, the moisture ejector valve shall be energized whenever the compressor is active. When the temperature is below 38 degrees Fahrenheit, the moisture ejector valve shall be energized whenever the compressor is inactive.

If the suspension system does not achieve the required position after 360 seconds when going from kneel to trim and 90 seconds from trim to kneel, the IP lamp will be activated at a ½ second on, ½ second off blink rate.

An output fault detection reset occurs whenever the ignition is cycled off.

Each valid position sensor input reading is averaged into the previous readings to create a time weighted average calculation.

Any valid vehicle low to trim or vehicle high to trim transition is delayed 640 msec. This road data averaging technique makes the system less sensitive to transients due to small bumps or irregular road surface.

Vehicle suspension control system configurations range widely from a single position sensor with a single actuator to multiple position sensors with multiple actuators and variations in between. Examples of various vehicle suspension control systems include single position sensor with single actuator for basic height control; single position sensor with multiple actuator to provide increased force/and or for failsafe redundancy; multiple redundant position sensors to provide safer operation; position sensing and actuation at each of left and right sides of one solid axle or one pair of independent axles for load management and/or dynamic tilt control; position sensing and actuation of both front suspension units and position sensing and actuation of at least one rear center or multiple separated suspension units for complete vehicle load management and complete dynamic level control.

One control unit can interface with multiple position sensors and with additional vehicle sensors to implement independent and/or dependent control functions for the representative positions measured. Multiple control units associated with independent position sensors of a multi-axis control system can interface in master/slave mode to share control circuitry, implement functional control hierarchy, share communication, and lower total system cost. Cooperation of multiple position sensing and actuations into a complete system enables adaptive reaction response to vehicle dynamics, road conditions, and drive inputs to provide better handling response and safer performance as described in the incorporated by reference patent.

While the invention has been described with a degree of particularity it is the intent that the invention include all modifications and alterations from the disclosed design falling within the spirit or scope of the appended claims.

What is claimed:

1. For use with a motor vehicle having at least one fluid-pressurized height adjusting member having first and second separable components, an integrated vehicle ride height system controller apparatus comprising:
   a) electronic output drive signal circuitry and input signal interpretation circuitry to electronically interface with at least one position sensor which provides output signals related to extent of separation of said first and second separable components of said at least one fluid pressurized height adjusting member;
   b) electronic input and/or output circuitry to interface with at least one fluid pressure sensor which provides output signals related to said at least one fluid-pressurized height-adjusting member;
   c) electronic output circuitry to actuate one or more fluid flow valves which apply pressure to said at least one fluid-pressurized height adjusting member to actuate raising thereof and wherein said one or more fluid flow valves release pressure from said at least one fluid-pressurized height adjusting member to actuate lowering thereof;
   d) electronic output circuitry to drive output power control for said at least one fluid pressure pump to provide system fluid power; and
   e) electronic circuitry incorporating control instructions for vehicle height control output functions in response to vehicle input signals.

2. The apparatus of claim 1 additionally comprising circuitry for interfacing with at least one suspension position sensor for each height-adjusting member.

3. The apparatus of claim 1 additionally comprising circuitry for interfacing with at least one suspension position sensor for each vehicle axle.

4. The apparatus of claim 1 additionally comprising circuitry for interfacing with at least one fluid pressure sensor for each height-adjusting member.

5. The apparatus of claim 1 additionally comprising circuitry for interfacing with at least one fluid pressure sensor for each vehicle axle.

6. The apparatus of claim 1 additionally comprising circuitry for interfacing with at least one fluid flow valve for each height-adjusting member to apply pressure to and to actuate raising of the fluid pressurized height-adjusting member.

7. The apparatus of claim 1 additionally comprising circuitry for interfacing with at least one fluid flow valve for each height-adjusting member to release pressure from and to actuate lowering of the fluid-pressurized height-adjusting member.

8. The apparatus of claim 1 additionally comprising circuitry for interfacing with pressure-actuated height-adjustment springs and/or shock absorber damping-adjustment means including pneumatic actuation, hydraulic actuation, electric actuation and/or combinations thereof based upon sensed operation parameters.

9. The apparatus of claim 1 additionally comprising circuitry for interfacing with manual control inputs for particular operational functions of raising and/or lowering the vehicle height.

10. The apparatus of claim 1 additionally comprising algorithm control to raise system accumulator pressure above a specified value in anticipation of the need for additional pressure subsequent to manual control operation of a vehicle height lowering.

11. The apparatus of claim 1 additionally comprising electronic circuitry to interface with at least one vehicle lateral acceleration sensor.

12. The apparatus of claim 1 additionally comprising electronic circuitry to interface with at least one forward acceleration and/or deceleration sensor.

13. The apparatus of claim 1 additionally comprising electronic circuitry to interface with at least one vehicle pitch sensor.

14. The apparatus of claim 1 additionally comprising electronic circuitry to interface with at least one vehicle yaw sensor.

15. The apparatus of claim 1 additionally comprising electronic circuitry to interface with at least one vehicle roll sensor.

16. The apparatus of claim 1 additionally comprising electronic circuitry to interface with at least one vehicle steering position sensor having at least one output signal.

17. The apparatus of claim 1 additionally comprising electronic circuitry to interface with at least one vehicle speed sensor.

18. The apparatus of claim 1 additionally comprising circuitry for interfacing with manual control inputs for particular operational functions such as increasing and/or decreasing fluid spring stiffness characteristics of the vehicle suspension.

19. The apparatus of claim 1 additionally comprising circuitry for interfacing with manual control inputs for particular operational functions such as increasing and/or decreasing fluid damping characteristics of the vehicle suspension.

20. The apparatus of claim 1 additionally comprising electronic circuitry to interface with a vehicle engine to modify engine intake air/fuel ratio to modify the torque curve to adapt to changes in load, speed, and/or road condition.

21. The apparatus of claim 1 additionally comprising electronic output circuitry to drive output control for at least one fluid flow valve to actuate lowering of the pressure in at least one pressure accumulator tank.

22. The apparatus of claim 1 additionally comprising electronic output circuitry to drive output control for at least one condensate blowdown valve for at least one system pressure reservoir.

23. The apparatus of claim 1 additionally comprising analog and digital electronic circuitry, memory, communications interface, indicator, annunciator, and/or system diagnostics or fault detection.

24. The apparatus of claim 23 additionally comprising short circuit protection for inputs and/or outputs.

25. The apparatus of claim 23 wherein said memory and communications interface provide for reprogramability of the controller.

26. The apparatus of claim 23 wherein said memory and communications interface provide for determination of fault status and/or operation history information to be communicated to other vehicle components and/or systems.

27. The apparatus of claim 23 wherein said analog and digital electronic circuitry includes hardware and/or software filters.

28. The apparatus of claim 23 wherein said control algorithms include dead zones from input signals to output drive actuators.

29. The apparatus of claim 23 wherein said control algorithms include hysteresis from output signals to output drive to actuators.

30. The apparatus of claim 23 wherein said control algorithms include time delays from input signal changes to output drive to actuators.

31. The apparatus of claim 1 additionally comprising electronic circuitry for system inputs and outputs to determine a system fault and indicate a fault status including short circuit, open circuit, incorrect impedance, incorrect signal, and/or function failure.

32. The apparatus of claim 31 wherein said system fault includes a pump fault.

33. The apparatus of claim 31 wherein said system fault status includes a sensor fault.

34. The apparatus of claim 31 wherein said system fault status includes a raising valve fault.

35. The apparatus of claim 31 wherein said system fault status includes a lowering valve fault.

36. The apparatus of claim 31 wherein said system fault status includes a fluid leak fault.

37. The apparatus of claim 31 wherein said system fault status includes a position sensor fault.

38. The apparatus of claim 31 wherein said fault status is reset by a specific sequence of manual switches.

39. The apparatus of claim 31 wherein said fault status includes communication of system failure to achieve the desired control position within a specified time from initiation of output actuation.

40. The apparatus of claim 1 additionally comprising environmentally-sealed construction.

41. The apparatus of claim 1 additionally comprising circuitry for interfacing with manual control inputs for particular operational control of enabling and disabling system functions.

42. The apparatus of claim 1 additionally compromising an automatic component function diagnostics mode that evaluates input signals, output electrical loads, and control response to determine functionally of input and output components.

43. The automatic diagnostics mode of claim 42 whereby automatic component function diagnostics occurs in a timed sequence for human observation of the actuation sequence to aid in diagnostics and/or troubleshooting system component performance.

44. The apparatus of claim 1 additionally compromising a manual diagnostics mode that evaluates specific component input signals, specific output electrical loads, and control response to determine functionality.

45. For use with a motor vehicle having at least one fluid-pressurized height adjusting member having first and second separable components, a vehicle ride height control method comprising:

a) monitoring an output from at least one position sensor which provides output signals related to extent of separation of said first and second separable components of at least one fluid pressurized height adjusting member;

b) monitoring an output from at least one fluid pressure sensor which provides output signals related to said at least one fluid-pressurized height-adjusting member;

c) actuating one or more fluid flow valves which apply pressure to said at least one fluid-pressurized height adjusting member to actuate raising and lowering of a portion of the motor vehicle with respect to a road surface; and d) controlling at least one fluid pressure pump to provide system fluid power for pressurizing the height adjusting member.

46. The method of claim 45 additionally comprising monitoring manual control inputs for particular operational functions of raising and/or lowering the vehicle height.

47. The method of claim 45 additionally comprising providing a system accumulator to provide system pressure above a specified value in anticipation of the need for additional pressure subsequent to manual control operation of vehicle height lowering.

48. The method of claim 45 additionally comprising controlling a condensate blowdown valve for at least one system pressure reservoir.

49. The method of claim 45 additionally providing a programmable controller for monitoring and controlling a raising and lowering of the motor vehicle and wherein the controller includes a controller memory and a communications interface and additionally comprising reprogramming the controller by downloading information to the controller memory.

50. The method of claim 49 wherein in a diagnostics mode the programmable controller automatically sends diagnostics to a display in a timed sequence for human observation of a component actuation sequence to aid in diagnostics and/or troubleshooting system component performance.

51. The method of claim 45 additionally comprising indicating a system fault status including short circuit, open circuit, incorrect impedance, incorrect signal, and/or function failure.

52. The method of claim 51 wherein said system fault includes a pump fault.

53. The method of claim 51 wherein said system fault status includes a position sensor fault.

54. The method of claim 51 wherein said system fault status includes a raising valve fault.

55. The method of claim 51 wherein said system fault status includes a lowering valve fault.

56. The method of claim 51 wherein said system fault status includes a fluid leak fault.

57. The method of claim 51 wherein said memory and communications interface provide fault status and/or operation history information to other vehicle components and/or systems.

* * * * *